(12) United States Patent
Crane

(10) Patent No.: X4071
(45) Date of Patent: Mar. 26, 1825

(54) SPINNING COTTON YARN

(76) Inventor: Luther Crane

United States Patent

Patent No.: X4071

Luther Crane.

Improvement in Manufacturing Cotton into yarn. Patented March 26. 1825 — See Volume of Restored Patents 22. page 485 incorrectly entered in that volume.

H.P.C.

DRAFTSMAN'S DIVISION.

*All communications should be addressed to*
"The Commissioner of Patents,
Washington, D. C."

2—328 a.

*DEPARTMENT OF THE INTERIOR,*

United States Patent Office,

*Washington, D. C.,* ......................................, *189*...

*SIR:*

*The printed* ........ copies ........ *of Patent No.* L Crane
........ are ........ *exhausted.* Mar 26, 1825

*As soon as printed a copy will be mailed you to complete your order.*

........................................................................

........................................................................

*By direction of the Commissioner:*

*Very respectfully,*

........................................

*Chief Clerk.*

........................................

........................................

........................................

8143b6-97-5m